United States Patent
Seifert

(10) Patent No.: US 8,759,684 B2
(45) Date of Patent: Jun. 24, 2014

(54) ADJUSTABLE SUPPORT INSULATOR FOR A HIGH-VOLTAGE LONG-DISTANCE TRANSMISSION LINE

(75) Inventor: Jens Seifert, Wunsiedel (DE)

(73) Assignee: Lapp Insulators GmbH, Wunsiedel (DE)

( * ) Notice: Subject to any disclaimer, the term of this patent is extended or adjusted under 35 U.S.C. 154(b) by 255 days.

(21) Appl. No.: 13/379,735

(22) PCT Filed: May 3, 2010

(86) PCT No.: PCT/EP2010/002677
§ 371 (c)(1),
(2), (4) Date: Feb. 1, 2012

(87) PCT Pub. No.: WO2011/000446
PCT Pub. Date: Jan. 6, 2011

(65) Prior Publication Data
US 2012/0168224 A1 Jul. 5, 2012

(30) Foreign Application Priority Data
Jul. 1, 2009 (DE) .......................... 10 2009 031 245

(51) Int. Cl.
*H01B 17/16* (2006.01)
*H02G 5/06* (2006.01)
*H01B 17/14* (2006.01)
*H01B 12/00* (2006.01)

(52) U.S. Cl.
CPC ............... *H02G 5/066* (2013.01); *H01B 17/14* (2013.01); *H01B 12/00* (2013.01)
USPC ................... 174/161 R; 174/70 C; 174/158 R

(58) Field of Classification Search
CPC ......... H02G 5/066; H02G 5/061; H02G 5/00; H01B 17/14; H01B 12/00
USPC ............ 174/70 C, 110 R, 137 R, 154, 158 R, 174/161 R, 168, 172, 174, 176–179
See application file for complete search history.

(56) References Cited

U.S. PATENT DOCUMENTS

| | | | | |
|---|---|---|---|---|
| 2,396,131 A | * | 3/1946 | Scott, Jr. ..................... | 174/99 B |
| 2,469,073 A | * | 5/1949 | McArthur et al. .......... | 174/99 E |
| 2,775,642 A | * | 12/1956 | Scott, Jr. ..................... | 174/99 B |

(Continued)

FOREIGN PATENT DOCUMENTS

| | | |
|---|---|---|
| DE | 7128174 U | 10/1971 |
| DE | 102004030527 A1 | 1/2006 |

(Continued)

OTHER PUBLICATIONS

International Preliminary Report on Patentability; Mailed Feb. 16, 2012 for the corresponding PCT Application No. PCT/EP2010/002677.
German Search Report; Mailed Mar. 27, 2012 for corresponding DE Application No. 10 2009 031 245.
International Search Report for PCT/EP2010/002677, Mailing Date: Oct. 5, 2010 (13 pages).

*Primary Examiner* — Angel R Estrada
*Assistant Examiner* — Dimary Lopez Cruz
(74) *Attorney, Agent, or Firm* — Mendelsohn, Drucker & Dunleavy, P.C.; Steve Mendelsohn

(57) ABSTRACT

The invention relates to a long-distance line for high voltage, having an outer jacket pipe extending in a longitudinal direction, having an inner conductor led in the interior of the jacket pipe in parallel to the longitudinal direction, and having a number of mounting insulators, by means of which the inner conductor is held on the jacket pipe at a distance therefrom transverse to the longitudinal direction, and a correspondingly embodied mounting insulator. The mounting insulators serve for adjusting the distance between the inner conductor and the jacket pipe. The long-distance transmission line is particularly air insulated in design. The mounting insulators allow simple assembly and installation of the inner conductor.

16 Claims, 2 Drawing Sheets

(56) References Cited

U.S. PATENT DOCUMENTS

| | | | | |
|---|---|---|---|---|
| 2,973,405 A | * | 2/1961 | Zuch et al. | 174/99 B |
| 3,712,953 A | | 1/1973 | Boersma et al. | |
| 5,811,734 A | * | 9/1998 | Ponsioen | 174/99 B |
| 6,215,075 B1 | * | 4/2001 | Pazdirek | 174/178 |
| 6,382,275 B1 | * | 5/2002 | Liao et al. | 144/129 |
| 7,612,293 B2 | * | 11/2009 | Arcand | 174/138 F |

FOREIGN PATENT DOCUMENTS

| | | |
|---|---|---|
| EP | 0572096 A1 | 12/1993 |
| JP | 10126911 A | 5/1998 |
| JP | 10164737 A | 6/1998 |

* cited by examiner

ADJUSTABLE SUPPORT INSULATOR FOR A HIGH-VOLTAGE LONG-DISTANCE TRANSMISSION LINE

FIELD OF THE INVENTION

The invention relates to a long-distance transmission line for high voltage having an outer casing tube which extends in a longitudinal direction, having an inner conductor which is routed parallel to the longitudinal direction in the interior of the casing tube and having a number of holding insulators, via which the inner conductor is held transversely with respect to the longitudinal direction on the casing tube and at a distance from it. The invention also relates to a holding insulator for separated attachment of an inner conductor in the interior of a casing tube, in particular for a correspondingly designed long-distance transmission line.

BACKGROUND OF THE INVENTION

By way of example, a long-distance transmission line of the abovementioned type is known from the article "Gasisolierter Rohrleiter (GIL) für Hochspannungsübertragungen" [Gas-insulated tubular conductor for high-voltage transmissions], Josef Kindersberger, IEEE Joint IAS/PELS/IES and PES German Chapter Meeting, Goldisthal, Oct. 14, 2005, the teachings of which are incorporated herein by reference. A long-distance transmission line such as this is used to transmit high voltage, in particular as a technical alternative to an overhead line. In this case, the inner conductor is at high voltage, while the casing tube is grounded. Holding insulators are provided at regular intervals along the longitudinal or transmission direction in the interior of the casing tube, which holding insulators support the inner conductor with respect to the casing tube and provide insulation for the voltage difference.

Although a long-distance transmission line such as this is more costly than an overhead line, it requires considerably less maintenance effort, however, since the inner conductor is not subject to any external dirt and weather influences. In particular, a tubular line such as this also complies with stringent safety requirements, since it is comparatively insensitive to fires or other environmental catatrophes. The long-distance transmission line according to the present publication is filled in the interior for insulation purposes with an inert gas, in particular an $N_2$—$SF_6$ gas mixture.

The described tubular line can be laid underground or overhead. The inner conductor, which is in the form of a tubular conductor, in the disclosed long-distance transmission line carries an AC voltage. Support insulators, disk supports and bulkhead supports are described in order to support the inner line. Bulkhead supports in particular have the purpose of restricting the emergence of inert gas in the event of damage, since they compartmentalize the internal area at regular intervals.

The provision of inert gas with an increased insulating capability makes it possible to design the described tubular line with smaller diameters. On the other hand, the line must be kept sealed overall, which leads to not inconsiderable complexity in particular at junction points between individual sections or parts of the long-distance transmission line.

SUMMARY OF THE INVENTION

The object of the invention is to further improve a long-distance transmission line of the type mentioned initially in terms of the options for use, its maintenance and its laying. A particular aim is also to specify holding insulators which are improved with respect to this object, for carrying the inner conductor in the casing tube, for a long-distance transmission line such as this.

The first-mentioned object is achieved according to the invention for a long-distance transmission line for high voltage having an outer casing tube which extends in a longitudinal direction, having an inner conductor which is routed parallel to the longitudinal direction in the interior of the casing tube and having a number of holding insulators, via which the inner conductor is held transversely with respect to the longitudinal direction on the casing tube and at a distance from it in that the holding insulators are designed for adjustment of the distance between the inner conductor and the casing tube.

In this case, the invention is in general terms based on the approach that the laying of the inner conductor in the interior of the basing tube is associated with not inconsiderable problems. In this case, on the one hand, a minimum distance must be maintained between the inner conductor and the casing tube in order to avoid voltage flashovers in the interior of the line. In other words the inner conductor should run approximately centrally in the casing tube, or, in the case of a round tube, should be laid coaxially with respect to it, thus ensuring a constant separation from the surrounding casing tube. In this case, the invention has identified that an adjustment capability for the inner conductor considerably simplifies the laying of the long-distance transmission line and makes a considerable contribution to improving safety, since it is now possible to compensate for manufacturing tolerances during assembly, or to take adequate account of curved laying sections.

Especially also in the case of a junction to larger diameters of the casing tube as are required in particular when inert gas is dispensed with for cost reasons, an adjustment capability for the inner conductor is desirable in order to prevent a voltage flashover in air. The junction between the inert gas and air in this case admittedly has the disadvantage that the long-distance transmission line has enlarged dimensions overall. However, to a certain extent, an air-insulated tubular line such as this is maintenance-free, since there is no need whatsoever to prevent inert gas from emerging. To this extent, a long-distance transmission line such as this can be laid over long distances, even through rough terrain, while nevertheless ensuring transmission reliability. In this case, there is neither any need for overhead line pylons nor to regularly keep a safety lane clear of subsequently growing vegetation, with respect to the voltage-carrying overhead line. For this purpose in particular, simplification of the laying process is particularly desirable, in order to further reduce costs.

The invention now continues further by providing an adjustment, capability for the inner conductor in a simple manner in that the holding insulator which holds the inner conductor is designed for adjustment of the distance between the inner conductor and the casing tube. A capability such as this then allows the inner conductor to be aligned appropriately during its fitting, during the laying process, in which case the holding insulators must be used in any case. To a certain extent, the holding insulator carries out the function of a turnbuckle for the inner conductor. For this purpose, by way of example, the insulator may be in the form of a support insulator, which has a section of variable length. The length of the variable section may for this purpose be set and locked, for example, by means of a suitable tool. A linear-movement or spindle adjustment mechanism can be envisaged in this case. A rotatable threaded connection can also be provided at one end of the holding insulator, with the other end of the holding insulator being firmly connected to the inner conductor or to the casing tube.

In one advantageous development of the long-distance transmission line, the holding insulators are essentially in the form of rods and are each screwed to the inner conductor and to the casing tube via a threaded connection, with the threaded connections having an opposite rotation sense with respect to one another on the inner conductor and on the casing tube. This provides a surprisingly simple adjustment capability for the distance between the inner conductor and the casing tube. Depending on the rotation sense of the holding insulator about its longitudinal axis, this is either screwed at both ends into the attachment points on the inner conductor and in the casing tube, or is screwed out from the attachment points. Simple rotation of the holding insulator which is in the form of a rod to this extent makes it possible to align the position of the inner conductor with respect to the casing tube exactly and as desired. At the threaded connections, the holding insulator is screwed in as envisaged as far as a nominal position, in particular as indicated by appropriate marking, and manufacturing tolerances, curvatures or the like are then compensated for by screwing further in or back. This considerably simplifies the process of laying the inner conductor in the casing tube. The mirror-image symmetrical configuration of the two metal fittings additionally reduces the production costs for the holding insulator.

In principle, the holding insulators may also be in the form of ceramic insulators. In order to achieve good insulation with robust mechanical strength at the same time, the holding insulators are, however, each preferably in the form of so-called composite insulators having a glass fiber stalk which is essentially in the form of a rod, and having an insulating compound which is applied thereto and in particular is composed of silicone rubber. The glass-fiber stalk provides the required mechanical robustness. In particular this is also insensitive to twisting as required for the abovementioned adjustment. The insulation capability is enhanced by the insulating compound applied to the stalk. Furthermore, in this case, the contamination tendency in respect to foreign particles, moisture or the like can in this case be improved by an appropriate chemical composition of the insulating compound.

The creepage distance over the surface of the composite insulator that is used can be designed in accordance with the dimension of the tubular line, of the voltage difference to be insulated or of the condensation state which is expected. The insulating compound which is applied to the glass fiber stalk may to this extent be configured with or without shields, which surround the stalk for example in the form of a plate or helically. In this case, the size and the number of the shields depend on the intended creepage distance size. In particular, the shields can also be provided only along a subsection of the composite insulator.

Expediently, the holding insulators have a metal fitting with a thread at each of the two ends. The rotation senses of the threads on the two metal fittings are in this case opposite to one another. The metal fittings are in this case, for example, adhesively bonded, connected by a shrink connection or are adhesively bonded with shrinkage in a combination therewith, to the rest of the insulating body.

The threads on the metal fittings may each be either in the form of internal threads or external threads. However, since an internal thread additionally necessitates connection points in the form of thread pins on the inner conductor side and on the casing tube side, it is preferable for the fitting ends to be in the form of threaded rods or threaded bolts. Since threaded rods enter the threaded holes on the inner conductor and on the casing tube, projecting edges and corners at the attachment point can be avoided, which is advantageous from the point of view of corona discharges.

In one preferred embodiment, a polygon for rotation of the respective holding insulator is formed on at least one metal fitting. By way of example, a polygon such as this can be gripped by means of a simple open-ended wrench or ring wrench, with the holding insulator in this way being rotated in its entirety about its longitudinal axis for adjustment of the inner conductor.

In the case of a composite insulator, it is expedient, because this results in a particularly close connection which can nevertheless be produced easily, for the metal fitting to be produced with the polygon and to be attached to the stalk by means of the polygon, with the polygon being pushed at least partially over the stalk end and being pressed and/or adhesively bonded onto the stalk end. In other words, the polygon has an internal diameter which corresponds approximately to the external diameter of the stalk end. In order to produce an interference fit, the internal diameter of the polygon is made slightly smaller than the external diameter of the stalk end. The metal fitting is heated, thus expanding the internal diameter of the polygon as a result of which it can be pushed over the stalk end. While cooling down, the internal diameter is reduced to the original dimensions, as a result of which the metal fitting is firmly connected to the stalk by an interference fit. Alternatively or in addition to an interference fit, the internal diameter of the polygon can be firmly adhesively bonded to the stalk end by means of a suitable adhesive, in particular an epoxy-resin adhesive. In order to produce adhesive pockets which lead to particularly firm retention, the stalk end or the inside of the polygon can be provided with circumferential grooves or depressions.

With the connection technique described above, the metal fitting is, in particular, essentially in the form of a threaded rod which, at its insulator-side end, has an appropriately configured hollow external polygon. A metal fitting such as this can be produced comparatively advantageously using known machining or non-machining production techniques. This also, of course, relates to an abovementioned embodiment of the holding insulator, in which a metal fitting with a threaded connection is provided at only one end.

Furthermore advantageously, the casing tube has a number of holding sockets which face outward, each of which holds the external threaded connections of the holding insulators. Alternatively or additionally, the inner conductor furthermore preferably has a number of holding sockets which face inward and each hold the internal threaded connections of the holding insulators.

The provision of holding sockets in which the threaded connections are held makes it possible to avoid corners and edges, which are disadvantageous for voltage or corona discharges. If the threaded connections enter the holding sockets, then this results in a relatively smooth junction in the interior of the long-distance transmission line between the inner walls of the inner conductor, and of the casing tube, which run in the longitudinal direction, with respect to the holding insulators, which are screwed in transversely.

The inner conductor may be in the form of a solid conductor or a tubular conductor. In the case of a solid inner conductor, its holding sockets are produced therefrom, for example by turning out or the like. In other words, the holding sockets of the inner conductor are then incorporated therein. In the case of a hollow inner conductor or in the case of the casing tube, the holding sockets are then formed from the material by appropriate recesses. In this case, the formed-out holding sockets will extend radially to beyond the external diameter of the casing tube. The holding sockets may also be externally visible if appropriate.

The polygons—if present—of the holding insulators are additionally held to a particular extent in the holding sockets, with the polygons each entering at least so far that their end edges on the insulator side are aligned with the respective outlet edges of the holding sockets. The respectively curved outlet zone at the connecting point of the holding insulators therefore at the same time acts as a field control means and as corona protection for the respective metal fitting. The polygons can be screwed into the appropriate holding sockets by means, for example, of a suitable wrench or the like. In this case, the holding socket is in the form of a blind hole with a sufficiently large diameter to hold the external polygon. A threaded hole is incorporated at the bottom of the blind hole, into which threaded hole the thread of the metal fitting can be screwed.

The abovementioned statements in particular also apply in terms of the configuration of the holding insulator, with this being equipped with a threaded fitting on only one side.

In one particularly advantageous refinement of the long-distance transmission line, the inner conductor is air-insulated from the casing tube. Although this results in the dimensions needing to be designed to be larger than in the case of insulation by means of inert gas, in order to avoid a voltage flashover, the long-distance transmission line need not, however, be designed to be gas-tight overall, nor do its individual sections need to be gas-tight. A long-distance transmission line such as this therefore requires considerably less maintenance than an inert-gas-insulated tubular line. There is no need for pressure drop sensors or a central control console for detection of a local pressure drop. Furthermore, an air-insulated long-distance transmission line having an inner conductor which is routed in the interior of the casing tube is suitable for voltage transmission over long distances through rough terrain. In particular, the line can be laid in the open air, at ground level, through regions with lush vegetation or through desert regions.

The specified long-distance transmission line is fundamentally suitable for transmission of both an AC voltage and a DC voltage. The long-distance transmission line is preferably designed to transmit a DC voltage for transmission over long distances. An undesirable wattless component, which cannot be used, occurs when an AC voltage is transmitted, because of the increased operating capacity of the tubular line, in comparison to an overhead line.

For an inner conductor, which is preferably laid coaxially with respect to a casing tube in the interior, both with a respective circular cross section, it can be shown that the maximum field strength on the surface of the inner conductor is given by:

$$E_a = \frac{V}{a \cdot \ln(b/a)}.$$

In this case, a is the radius of the inner conductor and b is the radius of the casing tube. If the ratio of the radius of the casing tube b to the radius of the inner conductor a corresponds to the Euler number e=2.718, the maximum field strength on the surface of the inner conductor is reduced to $$E_a = \frac{V}{a}.$$

Assuming a casing tube diameter of 3 m, and that the radius of the inner conductor is chosen to be a=0.55 m, corresponding to the preferred ratio of e, then, for an 800 kV DC voltage, this results in a maximum field strength on the surface of the inner conductor of $E_a$=800 kV/0.55 m=14.54 kV/cm.

A field strength such as this is below a critical flashover value in air of 30 kV/cm. Furthermore, the distance between the inner conductor and the casing tube in the present case is 0.95 m. In other words, the air-insulated long-distance transmission line can be used to transmit a DC voltage up to more than 800 kV, if it is designed appropriately. In this case, it is also necessary to take into account the fact that the inner conductor is laid in a protected form in the interior of the casing tube such that it is protected against external influences.

It can also be shown that, with the given dimensions, a power of 115 GW can be transmitted at a DC voltage of 800 kV using a long-distance transmission line with a length of 1500 km, with a maximum field strength of 15 kV/cm, with a voltage loss of 5%, with a casing tube composed of aluminum with a wall thickness of 1 cm, and air pressure in the interior at about 1 bar. The assumed voltage loss is in this case based on the line loss of a coaxial transmission system because of the resultant ohmic resistance.

The second-mentioned object is achieved according to the invention by a holding insulator for separated attachment of an inner conductor in the interior of a casing tube, by designing said holding insulator for adjustment of the distance between the inner conductor and the casing tube.

Further advantageous refinements can be found in the dependent claims which relate to a holding insulator. The advantages which have been mentioned with respect to corresponding refinements of the long-distance transmission line can in this case be transferred in the same sense to the holding insulator.

BRIEF DESCRIPTION OF THE DRAWINGS

Advantageous refinements of the invention are explained in more detail in a drawing, in which.

DETAILED DESCRIPTION

Figure 1:
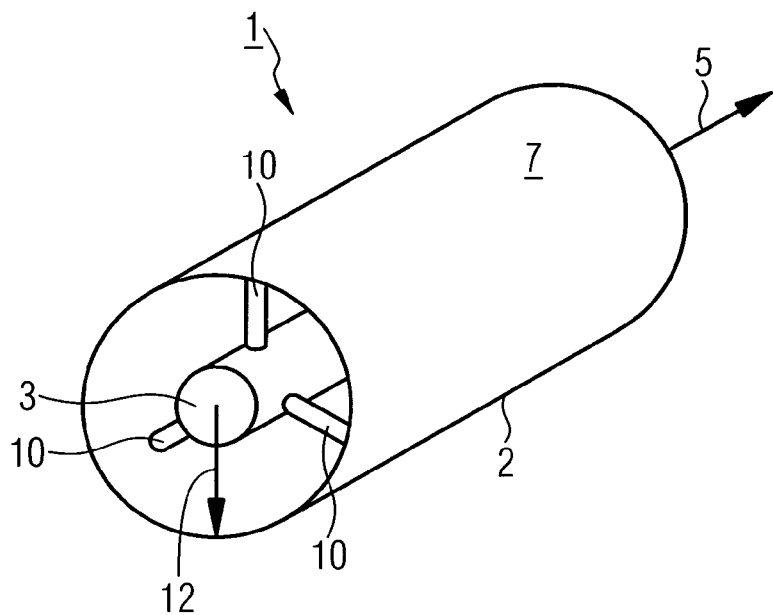
FIG. 1 shows, schematically, a section of a long-distance transmission line having an inner conductor, which is laid coaxially in the interior of a casing tube.

FIG. 1 schematically illustrates a section of a long-distance transmission line 1 in which a cylindrical, solid inner conductor 3 is laid in the interior of a hollow-cylindrical casing tube 2. In this case, the inner conductor 3 is laid coaxially with respect to the casing tube 2. Alternatively, the inner conductor is in the form of a tubular conductor. The long-distance transmission line 1 extends overall along a longitudinal direction 5. The figure in this case shows a single subpiece 7, with a multiplicity of subpieces 7 being placed adjacent to one another, overall, in the longitudinal direction 5, for example by screw connection or welding, to form the long-distance transmission line 1.

Figure 3:
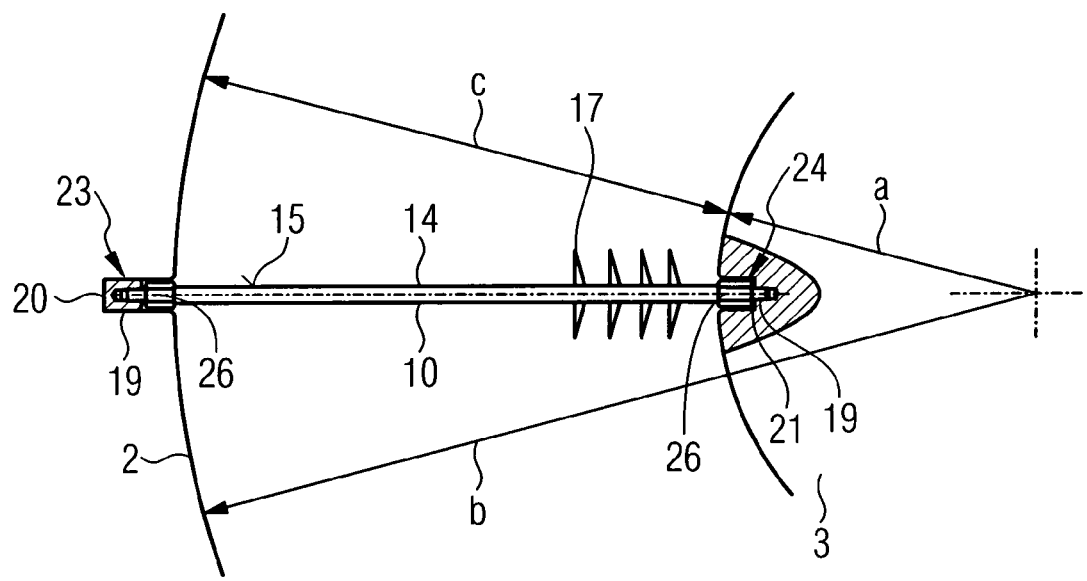
FIG. 3 shows an enlarged detail view from FIG. 2.
Figure 4:
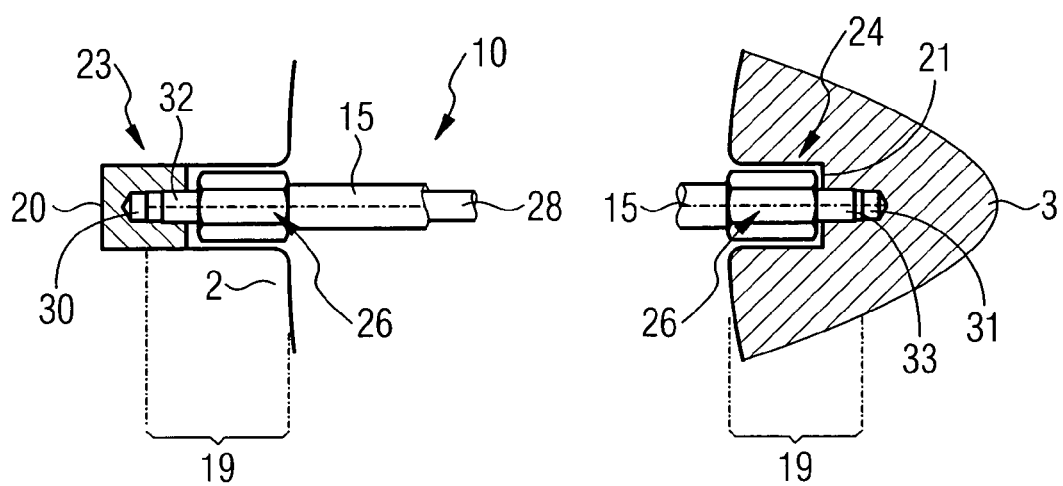
FIG. 4 shows holding sockets, in detail, for holding the threaded connections of the respective holding insulators.

Both the casing tube 2 and the inner conductor 3 are manufactured from aluminum or some other electrically highly conductive light metal alloy. At regular intervals along the longitudinal direction 5, the inner conductor 3 is held by means of in each case three holding insulators 10 in a lateral direction 12 on the casing tube 2, which holding insulators 10 are each arranged offset through 120° in the circumferential direction, and said inner conductor 3 is in this way kept at a distance from said casing tube 2. The holding insulators 10 are each manufactured as so-called rod insulators, which are firmly connected to the inner conductor 3 at one end and to the casing tube 2 at the other end. The holding insulators 10 are each designed for adjustment of the distance between the inner conductor 3 and the casing tube 2, as can be seen in FIGS. 3 and 4.

The long-distance transmission line 1 is filled in the interior with air at about 1 bar, that is to say atmospheric pressure. In this case, the inner conductor 3 is at a DC high voltage. The casing tube 2 is grounded.

Figure 2:
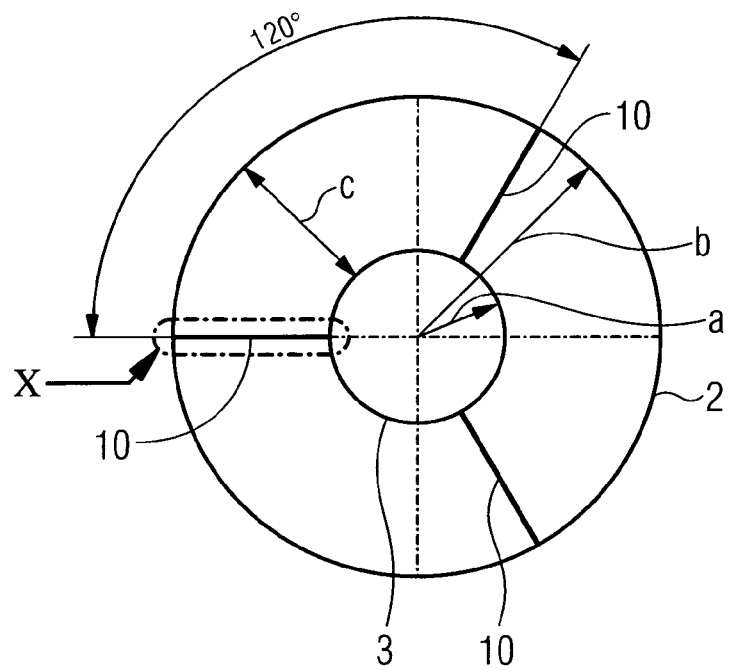
FIG. 2 shows a cross section through the long-distance transmission line shown in FIG. 1, at the location of the holding insulators.

FIG. 2 shows a cross section through the long-distance transmission line 1 as shown in FIG. 1, at the location of the holding insulators 10. The figure shows the inner conductor 3 with a radius a, which is held coaxially by means of the holding insulators 10 in the interior of the casing tube 2, which has a radius b. The distance which this results in between the inner conductor 3 and the casing tube 2 is annotated with the letter c. The three holding insulators 10 are distributed symmetrically around the inner conductor 3 in the circumferential direction. In other words, the angle between two adjacent holding insulators 10 is in each case 120°.

The long-distance transmission line 1 designed in the present way is designed for transmission of a DC voltage between about 500 kV and 800 kV. The radius b of the casing tube 2 is 1.5 m. The radius a of the inner conductor, which is solid in the present case, is 0.55 m. The distance c between the inner conductor 3 and the casing tube 2 amounts accordingly to 0.95 m. The ratio b/a corresponds to the Euler number e.

The detail X of a holding insulator 10 from FIG. 2 is illustrated enlarged in FIG. 3. Each holding insulator 10 is in the form of a so-called composite insulator, which comprises an insulating body 14, which runs in the lateral direction 12, is in the form of a rod and is composed of a glass-fiber-reinforced plastic. In order to increase the insulating property, an insulating compound 15 composed of silicone rubber is applied to the insulating body 14. Shields 17 which are in the form of plates and are composed of silicone rubber are formed in places between the two ends of the holding insulator 10, in order to increase the creepage distance. In this case, the insulating compound 15 with the formed-out shields is sprayed onto the insulating body 14.

There is a metal fitting 19 at each of the two ends of the holding insulator 10, and this metal fitting 19 is essentially used for attachment to the inner conductor 3 and to the casing tube 2. For attachment of the holding insulator 10 or its ends, holding sockets 20 are formed in the casing tube 2, and inner holding sockets 21 are recessed in the inner conductor 3, which is solid in the present case. In this case, external threaded connections 23 and internal threaded connections 24 are respectively formed in the interior of the holding sockets 20, 21, in conjunction with the metal fittings 19 of the holding insulator 10. The precise configuration is shown in FIG. 4.

The external threaded connection 23 and the internal threaded connection 24 have mutually opposite rotation senses. Rotation of the holding insulator 10 therefore results in it either being screwed into the two holding sockets 20, 21 or being screwed out of the two holding sockets 20, 21. To this extent, the holding insulator 10 acts as a turnbuckle for the adjustment of the inner conductor 3 in the interior of the casing tube 2. The two metal fittings 19 are each provided with a polygon 26, for rotation of the holding insulator 10. This can be gripped by a ring wrench, and can be rotated in a corresponding manner with the holding insulator. The metal fittings 19 including the polygon 26 are each firmly connected by means of a combined shrink/adhesive joint to the respective stalk ends of the insulating body 14. The precise configuration of the threaded connections 23, 24 is shown in FIG. 4.

Both the outer holding sockets 20, which are formed in the wall of the casing tube 2, and the inner holding sockets 21, which are formed in the inner conductor 3, each have threaded holes 30, 31. The respective threads 32 and 33 on the metal fittings 19 which are respectively in the form of threaded bolts and threaded rods, of each holding insulator 10 are screwed into or out of these holes 30, 31, depending on the rotation direction. The respective threads 32 and 33 on the threaded bolts of the metal fittings 19 each have mutually opposite rotation senses.

The threaded bolts of each metal fitting 19 each end on the insulator side in a polygon 26 for rotation of the holding insulator 10. In the assembled state, the metal fittings 19 are screwed into the respective holding sockets 20, 21 together with the polygon 26. For this purpose, each holding socket 20, 21 has a cylindrical blind hole, which the respective polygon 26 enters in the screwed-in state. The terminating edge of the respective polygon 19 on the insulator side is then aligned approximately with the outlet edge of the corresponding holding sockets 20, 21. The immersed length of the metal fittings 19 is shown in a corresponding manner in FIG. 4. The immersed polygon 26 acts as discharge or corona protection for the respective metal fitting 19. FIG. 4 furthermore shows the stalk 28, which forms the insulating body 14 that is in the form of a rod, and to which the insulating compound 15 is applied.

The invention claimed is:

1. A long-distance transmission line for high voltage having an outer casing tube which extends in a longitudinal direction, having an inner conductor which is routed parallel to the longitudinal direction in an interior of the outer casing tube and having a number of holding insulators, via which the inner conductor is held transversely with respect to the longitudinal direction on the outer casing tube and at a distance from the outer casing tube, wherein:
   the holding insulators are designed for adjustment of the distance between the inner conductor and the outer casing tube;
   the outer casing tube has a number of holding sockets which face outward, each of which holds an external threaded connection of a holding insulator; and
   the inner conductor has a number of holding sockets which face inward and each holds an internal threaded connection of a holding insulator.

2. The long-distance transmission line as claimed in claim 1, wherein the holding insulators are essentially in the form of rods and are each screwed to the inner conductor and to the outer casing tube via a threaded connection, with the threaded connections having an opposite rotation sense with respect to one another on the inner conductor and on the outer casing tube.

3. The long-distance transmission line as claimed in claim 1, wherein the holding insulators are each in the form of composite insulators having a glass fiber stalk which is essentially in the form of a rod, and having an insulating compound which is applied thereto.

4. The long-distance transmission line as claimed in claim 1, wherein the holding insulators have a metal fitting with a thread at each of the two ends, with the rotation senses of the threads on the two metal fittings being opposite to one another.

5. The long-distance transmission line as claimed in claim 4, wherein a polygon for rotation of a respective holding insulator is formed on at least one metal fitting.

6. The long-distance transmission line as claimed in claim 5, wherein the polygon attaches the metal fitting to a stalk of a composite insulator, with the polygon being pushed at least partially over an end of the stalk end and being at least one of pressed and adhesively bonded onto the stalk end.

7. The long-distance transmission line as claimed in claim 1, wherein polygons of the holding insulators are additionally held in the holding sockets, with the polygons each entering at least so far that end edges of the polygons on the insulator side are aligned with respective outlet edges of the holding sockets.

8. The long-distance transmission line as claimed in claim 1, wherein the inner conductor is air-insulated from the outer casing tube.

9. The long-distance transmission line as claimed in claim 1, wherein the inner conductor is held essentially coaxially with respect to the outer casing tube.

10. The long-distance transmission line as claimed in claim 1, wherein the inner conductor and the outer casing tube each have a circular cross section, and in wherein a ratio of the radius of the outer casing tube to the radius of the inner conductor corresponds to the Euler number e.

11. A holding insulator for separated attachment of an inner conductor in an interior of a casing tube, wherein:
   the holding insulator is designed for adjustment of a distance between the inner conductor and the casing tube;
   the holding insulator comprising an insulating body which is essentially in the form of a rod and has a thread at each of its two ends;
   a metal fitting having a thread is provided for screw connection at each of the two ends of the rod;
   a polygon for rotation of the respective holding insulator is formed on at least one metal fitting; and
   the polygon attaches the metal fitting to a stalk with the polygon being pushed at least partially over the stalk end and being at least one of pressed and adhesively bonded onto the stalk end.

12. The holding insulator as claimed in claim 11, wherein the two threads on the two ends of the rod have an opposite rotation sense to one another.

13. The holding insulator as claimed in claim 12, wherein the rotation senses of the threads on the two metal fittings are opposite to one another.

14. The holding insulator as claimed in claim 11, wherein the holding insulator is in the form of a composite insulator having a glass-fiber stalk which is essentially in the form of a rod, and having an insulating compound which is applied thereto.

15. A long-distance transmission line for high voltage having an outer casing tube which extends in a longitudinal direction, having an inner conductor which is routed parallel to the longitudinal direction in an interior of the outer casing tube and having a number of holding insulators, via which the inner conductor is held transversely with respect to the longitudinal direction on the outer casing tube and at a distance from the outer casing tube, wherein:
   the holding insulators are designed for adjustment of the distance between the inner conductor and the outer casing tube;
   the holding insulators have a metal fitting with a thread at each of the two ends;
   a polygon for rotation of a respective holding insulator is formed on at least one metal fitting; and
   the polygon attaches the metal fitting to a stalk of a composite insulator, with the polygon being pushed at least partially over an end of the stalk end and being at least one of pressed and adhesively bonded onto the stalk end.

16. The long-distance transmission line as claimed in claim 15, wherein the rotation senses of the threads on the two metal fittings are opposite to one another.

\* \* \* \* \*